United States Patent

(12) United States Patent
Hanai

(10) Patent No.: US 6,659,826 B2
(45) Date of Patent: Dec. 9, 2003

(54) MANUFACTURING METHOD FOR A SPARK PLUG

(75) Inventor: Takeshi Hanai, Kuwana (JP)

(73) Assignee: Denso Corporation, Kariya (JP)

( * ) Notice: Subject to any disclaimer, the term of this patent is extended or adjusted under 35 U.S.C. 154(b) by 168 days.

(21) Appl. No.: 10/011,308

(22) Filed: Dec. 11, 2001

(65) Prior Publication Data

US 2002/0081932 A1 Jun. 27, 2002

(30) Foreign Application Priority Data

Dec. 26, 2000 (JP) ........................................ 2000-395531

(51) Int. Cl.[7] .............................................. H01T 13/20
(52) U.S. Cl. ...................... 445/7; 219/91.2; 219/86.24
(58) Field of Search .................. 445/7; 219/86.24, 219/161, 91.2

(56) References Cited

U.S. PATENT DOCUMENTS 3,993,787 A * 11/1976 Nakabayashi et al. ...... 425/125
4,765,786 A * 8/1988 Krogh ........................ 408/110
5,154,873 A * 10/1992 Sato et al. ................... 264/279
5,333,542 A * 8/1994 Lewis et al. .................. 100/45
5,808,266 A * 9/1998 Cecil ........................... 219/110

FOREIGN PATENT DOCUMENTS

JP          06-45049          2/1994

* cited by examiner

Primary Examiner—Kenneth J. Ramsey
(74) Attorney, Agent, or Firm—Nixon & Vanderhye P.C.

(57) ABSTRACT

First and second guides of a guide jig are removed from a tip in a direction normal to an axial direction of the tip. This surely prevents the guide jig from touching and moving the tip when the guide jig departs from the tip. Accordingly, the welding operation can be performed properly under a condition that the tip is accurately positioned on a ground electrode. Thus, it becomes possible to reduce a manufacturing error of the discharge gap formed between a center electrode and the ground electrode.

7 Claims, 4 Drawing Sheets

MANUFACTURING METHOD FOR A SPARK PLUG

BACKGROUND OF THE INVENTION

The present invention relates to a method for manufacturing a spark plug which has two electrodes (i.e., center electrode and ground electrode) opposed to form a predetermined gap and a noble metal tip welded to at least one of these electrodes.

FIGS. 4A and 4B show a conventional welding method for a spark plug. First, as shown in FIG. 4A, a tip 103a is inserted into a hole of a guide jig 110. The guide jig 110 is used to locate the tip 103a to a predetermined position on a plug electrode 103 (such as a ground electrode or a center electrode). Then, the guide jig 110 is removed upward to leave the tip 103a standing upright on the electrode 103. Then, electric or resistance welding is performed to fix the tip 103a to the plug electrode 103 under a condition that tip 103a is depressed by a welding electrode 120 (refer to FIG. 4B).

According to this conventional welding method, the guide jig may touch the tip 103a standing upright on the electrode 103 when the guide jig is raised upward. Thus, the tip 103a may move or slide on the electrode.

If the hole of guide jig 110 is enlarged to solve this problem, it will deteriorate the accuracy in positioning the tip 103a on the plug electrode 103. In other words, the distance (i.e., discharge gap) between the electrodes will become inaccurate and accordingly the properties of the spark plug will be worsened.

SUMMARY OF THE INVENTION

To solve the above problems, the present invention has an object to provide a manufacturing method for a spark plug capable of accurately positioning a tip on a plug electrode before welding the tip to this electrode.

In order to accomplish the above and other related objects, the present invention provides a first method for manufacturing a spark plug having two electrodes opposed to cause a spark discharge and a noble metal tip welded to at least one of these plug electrodes. A first process of the first manufacturing method is performed to clamp the tip by first and second guides of a guide jig approaching to each other in a direction normal to an axial direction of the tip and to locate the tip to a predetermined position on a plug electrode. A second process of the first manufacturing method, succeeding the first process, is performed to depress the tip by a welding electrode under a condition that the tip is held by the guide jig, in which a thickness of the guide jig is smaller than a clearance between the welding electrode and the plug electrode. A third process of the first manufacturing method, succeeding the second process, is performed to remove the first and second guides of the guide jig from the tip in the direction normal to the axial direction of the tip. A fourth process of the first manufacturing method, succeeding the third process, is performed to weld the tip to the plug electrode by supplying electric power to the welding electrode.

According to the first manufacturing method, the first and second guides of the guide jig shift in the direction normal to the axial direction of the tip. This movement surely prevents the guide jig (i.e., either the first guide or the second guide) from touching and moving the tip when the guide jig departs from the tip.

Thus, the first manufacturing method assures an excellent welding operation performed under the condition that the tip is accurately positioned on the plug electrode. The first manufacturing method makes it possible to reduce a manufacturing error of the discharge gap formed between the opposed electrodes.

Furthermore, according to the first manufacturing method, the first and second guides of the guide jig depart from the tip under the condition that a pressing force of the welding electrode is applied on the tip. This surely prevents the tip from being moved by the guide jig (i.e., either the first guide or the second guide). The manufacturing error of the discharge gap can be further reduced.

The present invention provides a second method for manufacturing a spark plug having two electrodes opposed to cause a spark discharge and a noble metal tip welded to at least one of these plug electrodes. A first process of the second manufacturing method is performed to clamp the tip by first and second guides of a guide jig approaching to each other in a direction normal to an axial direction of the tip and to locate the tip to a predetermined position on a plug electrode. A second process of the second manufacturing method, succeeding the first process, is performed to remove the first and second guides of the guide jig from the tip in the direction normal to the axial direction of the tip. A third process of the second manufacturing method, succeeding the second process, is performed to depress the tip by a welding electrode. A fourth process of the second manufacturing method, succeeding the third process, is performed to weld the tip to the plug electrode by supplying electric power to the welding electrode.

According to the second manufacturing method, the first and second guides of the guide jig shift in the direction normal to the axial direction of the tip. This movement surely prevents the guide jig (i.e., either the first guide or the second guide) from touching and moving the tip when the guide jig departs from the tip.

Thus, the second manufacturing method assures an excellent welding operation performed under the condition that the tip is accurately positioned on the plug electrode. The second manufacturing method makes it possible to reduce a manufacturing error of the discharge gap formed between the opposed electrodes.

According to a preferable embodiment of the second manufacturing method, a height of the guide jig is lower than a height of the tip positioned on the plug electrode, when the guide jig is placed on the plug electrode to clamp the tip.

It is also preferable that at least one of the first and second guides of the guide jig has a triangular or comparable notch for guiding the tip. This makes it possible to automatically center the tip to a predetermined position on the plug electrode when the guide jig clamps the tip.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS preferred embodiments of the present invention will be explained hereinafter with reference to attached drawings. Identical parts are denoted by the same reference numerals throughout the drawings.

First Embodiment

Figure 1A:
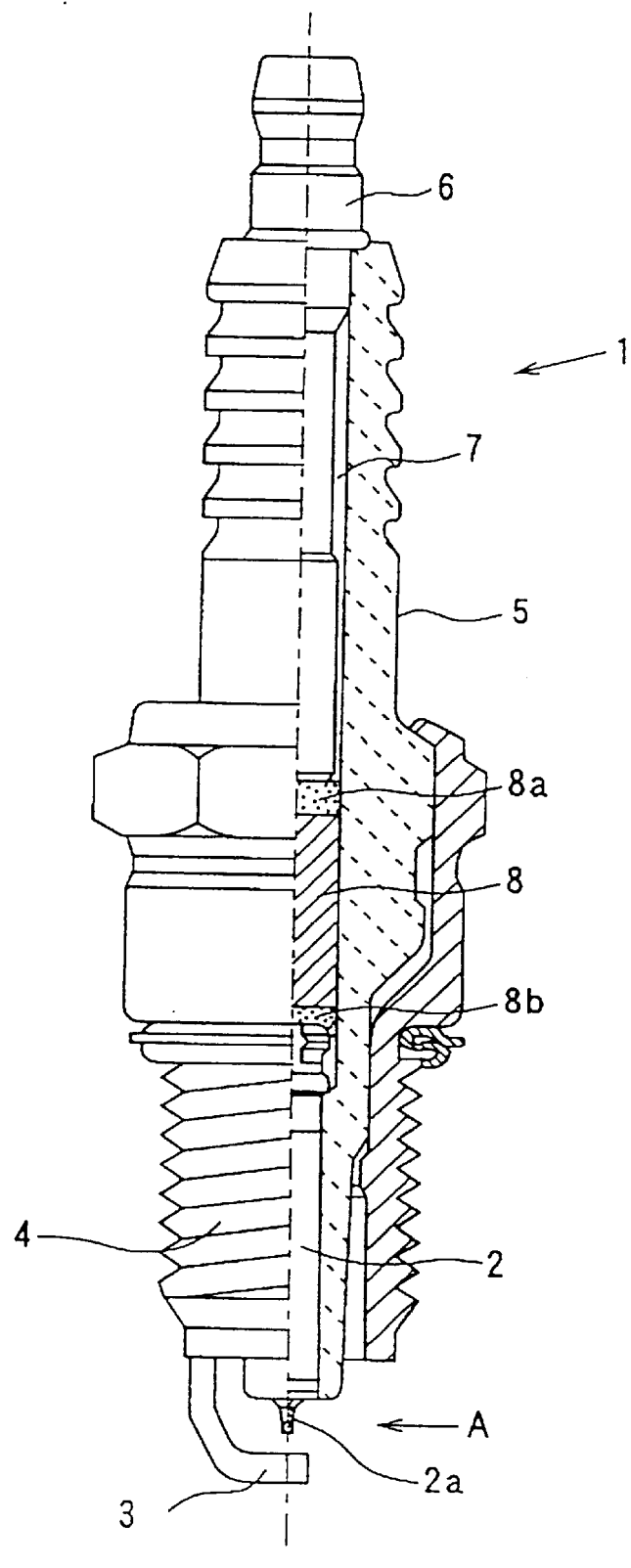
FIG. 1A is a half cross-sectional view showing a spark plug in accordance with a preferred embodiment of the present invention.

FIG. 1A shows a half cross-sectional view showing a spark plug 1 applicable to an internal combustion engine.

The spark plug 1 comprises a center electrode 2 located on the center axis thereof and a ground electrode 3 fixed to an axial end of a cylindrical metal housing 4. The metal hosing 4 is made of an electrically conductive steel member (e.g., low carbon steel). The metal housing 4 has an inside space for securely holding a cylindrical insulator 5. The insulator 5 is made of an alumina ceramic ($Al_2O_3$) or a comparable electrically insulating material. One end of insulator 5 protrudes out of the metal housing 4.

A metal stem 7, provided with a terminal 6, is positioned in an axially extending inner hollow space of the insulator 5. An electric resistor 8 is positioned between the stem 7 and the center electrode 2 aligned in the axial direction of the spark plug 1.

In response to application of a predetermined voltage, the spark plug 1 causes an electric discharge (i.e., spark) between the center electrode 2 and the ground electrode 3 to ignite gaseous fuel charged in a combustion chamber of the internal combustion engine.

The center electrode 2 has a cylindrical body consisting of an inner member, such as a copper or comparable metal member, having excellent thermal conductivity and an outer member, such as a Ni-group alloy or comparable metal member, having excellent heat resistance and corrosion resistance. An apical end 2a of center electrode 2 protrudes out of the insulator 5 toward the ground electrode 3.

The ground electrode 3 is made of a Ni-group alloy containing Ni as a chief material. The ground electrode 3 has a proximal portion securely welded to the axial end of metal housing 4. The ground electrode 3 is bent at an intermediate portion perpendicularly to form an L-shaped configuration. A noble metal (e.g., platinum) tip 3a is welded on the distal portion of ground electrode 3, so as to form a discharge gap between the apical end 2a of center electrode 2 and the noble metal tip of ground electrode 3.

To form the resistor 8, an electric resistive powder material chiefly containing a glass component mixed with a carbon powder is sintered in a furnace and configured into a rod or columnar shape of the resistor 8. Glass sealing layers 8a and 8b, made of electric conductive glass, are provided at longitudinal ends of the resistor 8 to prevent the combustion chamber side (including the center electrode 2) from communicating with the outside (including the terminal 6).

After forming the resister 8 in the insulator 5, the housing 4 is securely fixed with the insulator 5 by caulking (deforming) part of the housing 4.

The spark plug 1 of this embodiment is manufactured according to the following manufacturing method chiefly including the step of fixing the tip 3a to the ground electrode 3 by electric or resistance welding.

Figure 2A:
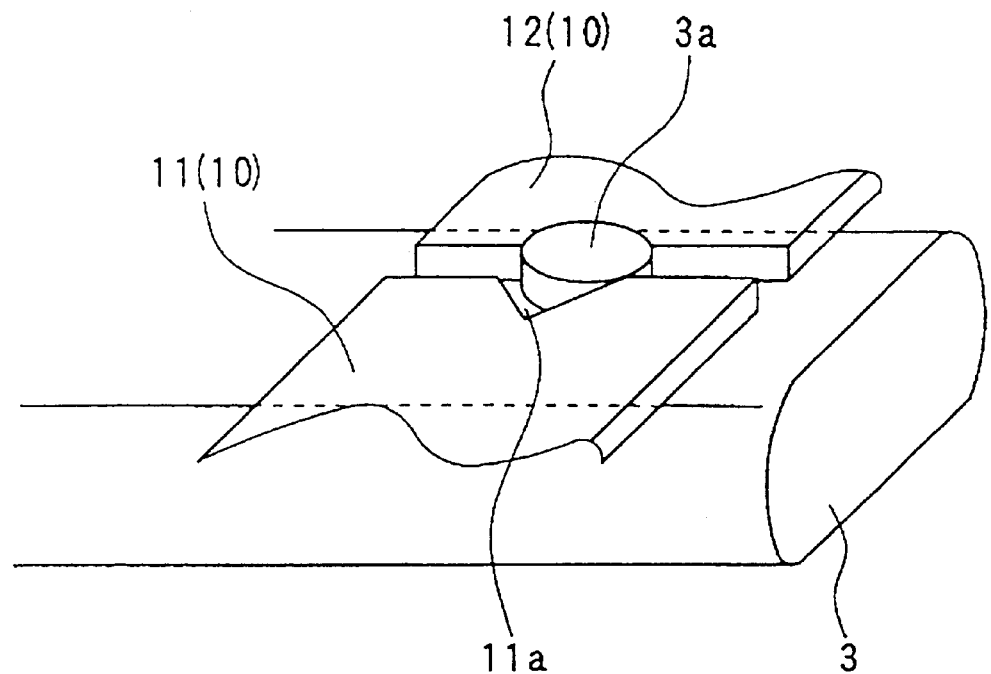
FIG. 2A is a perspective view showing part of a manufacturing apparatus for the spark plug in accordance with the preferred embodiment of the present invention.
Figure 2B:
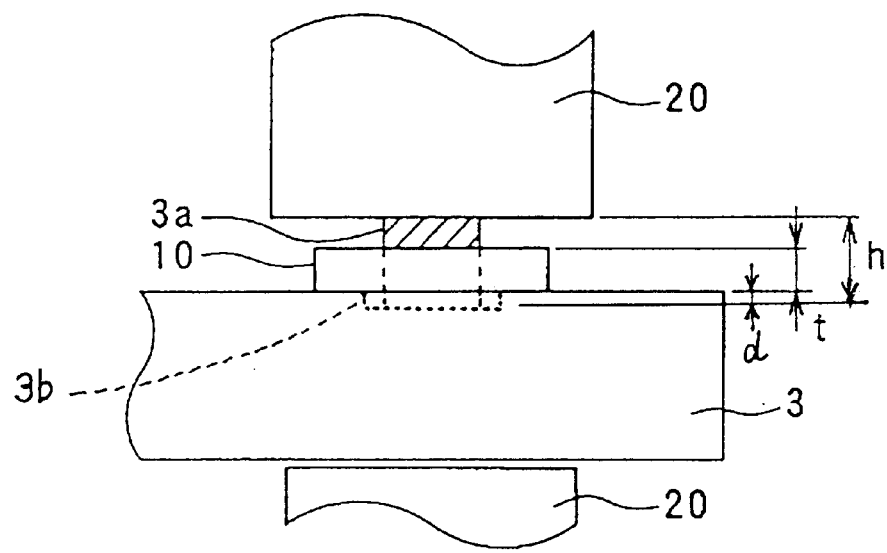
FIG. 2B is a front view showing the manufacturing apparatus shown in FIG. 2A.

As shown in FIGS. 2A and 2B, a manufacturing apparatus of this embodiment is equipped with a platelike guide jig 10. The guide jig 10 consists of a first guide 11 and a second guide 12 for clamping the tip 3a between opposed ends thereof. The opposed end of the first guide 11 has a triangular notch 11a, while the opposed end of the second guide 12 is configured into a straight end. The guide jig 10 is made of a steel plate having excellent rigidity.

The ground electrode 3 has a recess 3b for receiving the tip 3 so that the tip 3a can be easily located on the electrode 3. The thickness 't' of guide jig 10 plus the depth 'd' of recess 3b is smaller than the axial size 'h' of the tip 3a.

In welding the tip 3a, the first guide 11 and the second guide 12 of the guide jig 10 approach to each other in the direction normal to the axial direction of tip 3a to clamp the tip 3a. Then, the first guide 11 and the second guide 12 cooperatively locate the tip 3a to a predetermined position on the ground electrode 3 (refer to as first process).

After being positioned by the guide jig 10, the tip 3a is depressed by a welding electrode 20 (referred to as second process). Then, under the condition that the tip 3a is depressed by the welding electrode 20, the first guide 11 and the second guide 12 are removed from the tip 3a in the direction normal to the axial direction of tip 3a (refer to as third process). Then, the tip 3a is welded to the ground electrode 3 by supplying electric power to the welding electrode 20 while the tip 3a is depressed by the welding electrode 20 (refer to as fourth process).

Figure 1B:
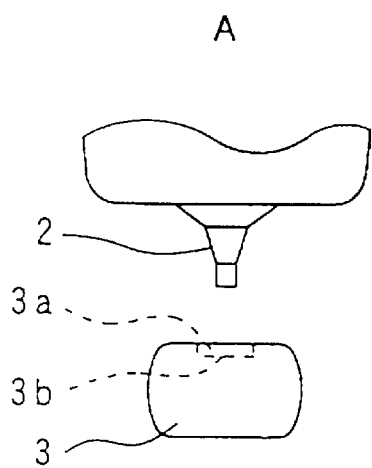
FIG. 1B is an enlarged view showing a center electrode and a ground electrode of the spark plug shown in FIG. 1A.

When the welding operation is finished, substantially no height difference remains between the tip 3a and the ground electrode 3 as shown in FIG. 1B.

The manufacturing method of the above-described embodiment has the following characteristics (functions and effects).

The first guide 11 and the second guide 12 of the guide jig 10 shift in the direction normal to the axial direction of the tip 3a. This movement surely prevents the guide jig 10 (i.e., either first guide 11 or second guide 12) from touching and moving the tip 3a when the guide jig 10 departs from the tip 3a.

Accordingly, the welding operation can be performed properly under the condition that the tip 3a is accurately positioned on the ground electrode 3. Thus, it becomes possible to reduce a manufacturing error of the discharge gap formed between the center electrode 2 and the ground electrode 3.

The first guide 11 and the second guide 12 of the guide jig 10 depart from the tip 3a under the condition that a pressing force of the welding electrode 20 is applied on the tip 3a. This surely prevents the tip 3a from being moved by the guide jig 10 (i.e., either first guide 11 or second guide 12), thereby further reducing a manufacturing error of the discharge gap formed between the center electrode 2 and the ground electrode 3.

Furthermore, the guide jig 10 (the first guide 11 in this embodiment) has the notch 11a. This is effective to automatically center the tip 3a to a predetermined position on the ground electrode 3 when the guide jig 10 clamps the tip 3a.

Second Embodiment

The second embodiment differs from the first embodiment in that the order of the second process and the third process is reversed. Namely, the tip 3a is depressed by the welding electrode 20 after the guide jig 10 departs from the tip 3a.

Like the first embodiment, according to the manufacturing method of the second embodiment, the first guide 11 and the second guide 12 of the guide jig 10 depart from the tip 3a in the direction normal to the axial direction of the tip 3a. This movement surely prevents the guide jig 10 (i.e., either first guide 11 or second guide 12) from touching and moving the tip 3a when the guide jig 10 departs from the tip 3a.

Other Embodiment

Figure 3A:
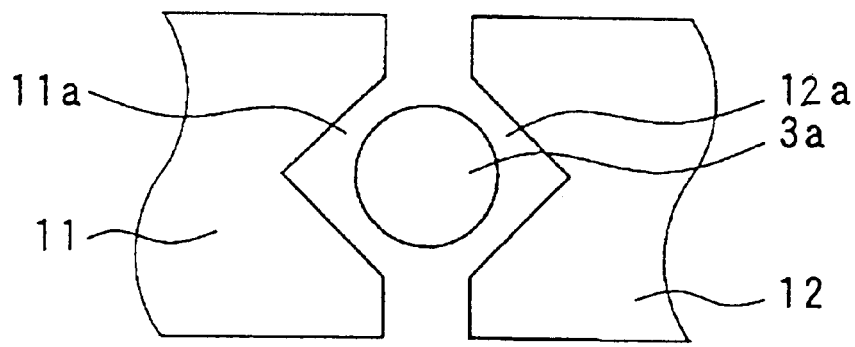
FIGS. 3A to 3D are views showing different types of guide jigs respectively applicable to the manufacturing apparatus for the spark plug in accordance with the preferred embodiment of the present invention.
Figure 3B:
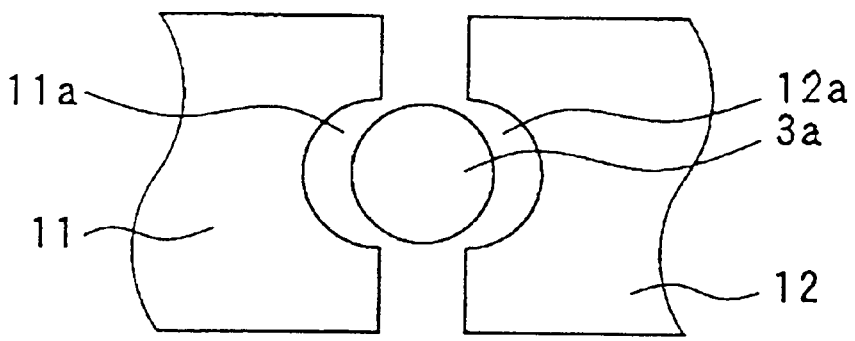
Figure 3C:
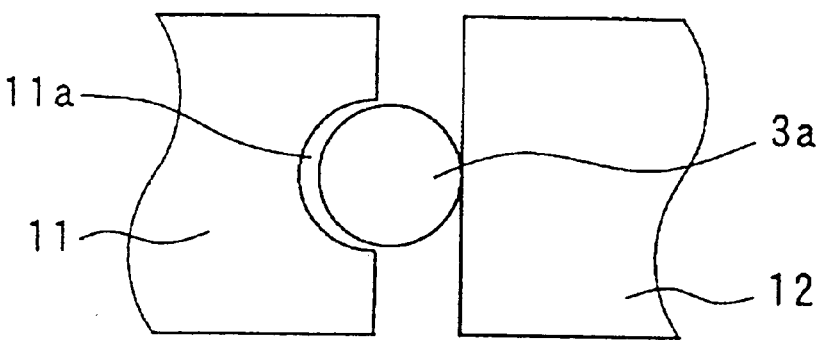
Figure 3D:
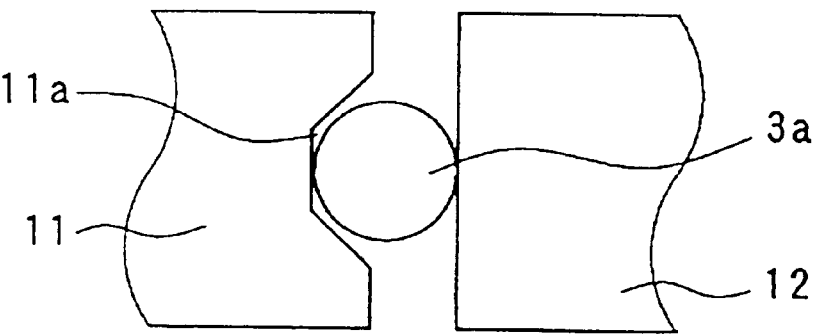
Figure 4A:
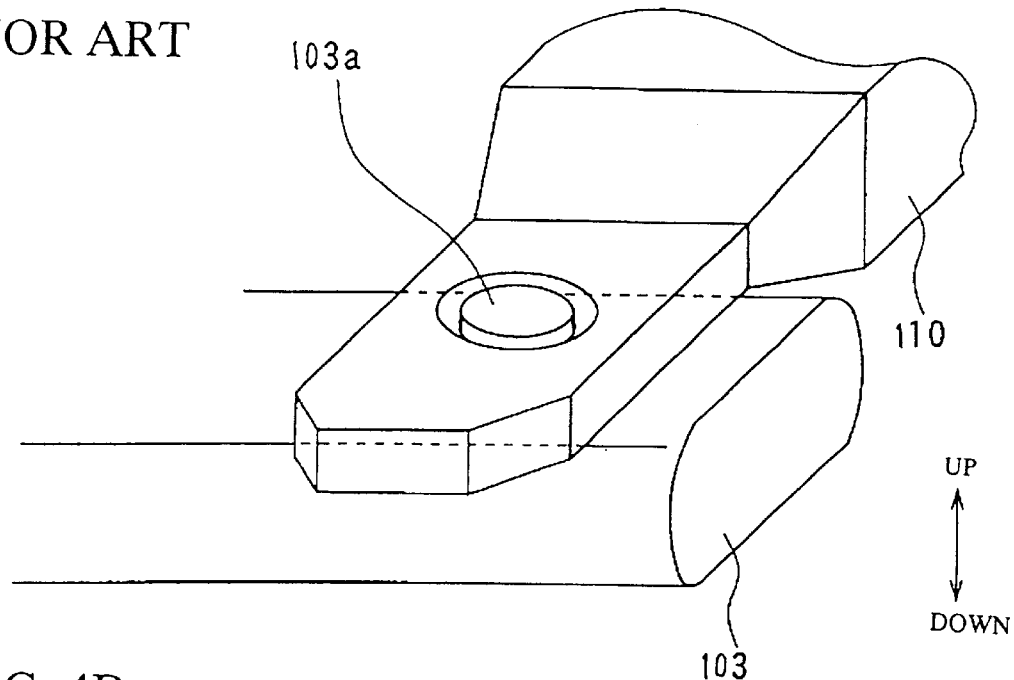
FIG. 4A is a perspective view showing part of a conventional manufacturing apparatus for a spark plug.
Figure 4B:
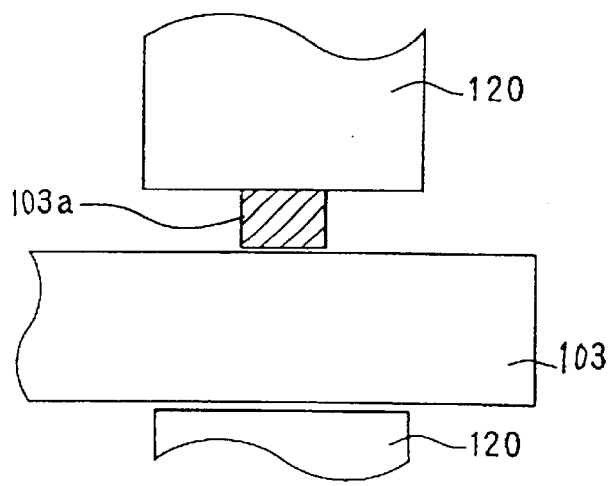
FIG. 4B is a front view showing the conventional manufacturing apparatus shown in FIG. 4A.

The guide jig 10 of the present invention can be variously modified. FIG. 3A shows a different type of guide jig consisting of a first guide 11 having a triangular notch 11a and a second guide 12 having a triangular notch 12a. FIG. 3B shows another type of guide jig consisting of a first guide 11 having a semicircular notch 11a and a second guide 12 having a semicircular notch 12a. FIG. 3C shows another type of guide jig consisting of a first guide 11 having a semicircular notch 11a and a second guide 12 having a straight opposed end. FIG. 3D shows another type of guide jig consisting of a first guide 11 having a trapezoidal notch 11a and a second guide 12 having a straight opposed end.

It is needless to say that the above-described manufacturing method can be applied to a tip welded to the center electrode 2.

What is claimed is:

1. A method for manufacturing a spark plug having two electrodes opposed to cause a spark discharge and a noble metal tip welded to at least one of these plug electrodes, said manufacturing method comprising:

a first process for clamping said tip by first and second guides of a guide jig approaching to each other in a direction normal to an axial direction of said tip and locating said tip to a predetermined position on a plug electrode;

a second process, succeeding said first process, for depressing said tip by a welding electrode under a condition that the tip is held by the guide jig, in which a thickness of said guide jig is smaller than a clearance between said welding electrode and said plug electrode;

a third process, succeeding said second process, for removing said first and second guides of said guide jig from said tip in the direction normal to the axial direction of said tip; and a fourth process, succeeding said third process, for welding said tip to said plug electrode by supplying electric power to said welding electrode.

2. A method for manufacturing a spark plug having two electrodes opposed to cause a spark discharge and a noble metal tip welded to at least one of these plug electrodes, said manufacturing method comprising:

a first process for clamping said tip by first and second guides of a guide jig approaching to each other in a direction normal to an axial direction of said tip and locating said tip to a predetermined position on a plug electrode;

a second process, succeeding said first process, for removing said first and second guides of said guide jig from said tip in the direction normal to the axial direction of said tip;

a third process, succeeding said second process, for depressing said tip by a welding electrode; and a fourth process, succeeding said third process, for welding said tip to said plug electrode by supplying electric power to said welding electrode.

3. The manufacturing method in accordance with claim 2, wherein a height of said guide jig is lower than a height of said tip positioned on said plug electrode, when said guide jig is placed on said plug electrode to clamp said tip.

4. The manufacturing method in accordance with claim 1, wherein at least one of said first and second guides of said guide jig has a notch for guiding the tip.

5. The manufacturing method in accordance with claim 4, wherein said notch is triangular.

6. The manufacturing method in accordance with claim 2, wherein at least one of said first and second guides of said guide jig has a notch for guiding the tip.

7. The manufacturing method in accordance with claim 6, wherein said notch is triangular.

* * * * *